(12) United States Patent
Nagai

(10) Patent No.: US 7,771,122 B2
(45) Date of Patent: Aug. 10, 2010

(54) CAGE FOR ROLLING BEARING AND ROLLING BEARING HAVING THE SAME

(75) Inventor: Setsuo Nagai, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 382 days.

(21) Appl. No.: 12/007,895

(22) Filed: Jan. 16, 2008

(65) Prior Publication Data

US 2008/0285904 A1 Nov. 20, 2008

(30) Foreign Application Priority Data

Jan. 19, 2007 (JP) ............................. 2007-009908

(51) Int. Cl.
*F16C 33/66* (2006.01)
(52) U.S. Cl. ........................ 384/470; 384/572
(58) Field of Classification Search ............ 384/470, 384/572–580
See application file for complete search history.

(56) References Cited

U.S. PATENT DOCUMENTS

| 5,772,338 | A  | * | 6/1998  | Hillmann et al. ............. 384/470 |
| 6,206,575 | B1 | * | 3/2001  | Matsushita et al. .......... 384/523 |
| 6,461,049 | B2 | * | 10/2002 | Straub et al. ................ 384/470 |
| 6,742,934 | B2 | * | 6/2004  | Matsuyama et al. ......... 384/572 |

FOREIGN PATENT DOCUMENTS

JP    2002-349580    12/2002

* cited by examiner

*Primary Examiner*—Thomas R Hannon
(74) *Attorney, Agent, or Firm*—McGinn IP Law Group, PLLC

(57) ABSTRACT

A concave surface 60 is formed in an outer peripheral surface of each of pillar portions 26 of a cage 40. A plurality of recesses 42, 43, 52 and 53 are formed in outer peripheral surfaces of annular portions 24 and 25 of the cage 40. There are provided passageways 46, 47, 56 and 57 communicating respectively with the recesses 42, 43, 52 and 53. An axially-outer end of each of the passageways 46, 47, 56 and 57 is open to an axial inner end face of the annular portion 24, 25 or to the concave surface 60 of the pillar portion 26.

5 Claims, 4 Drawing Sheets

CAGE FOR ROLLING BEARING AND ROLLING BEARING HAVING THE SAME

This invention relates to a cage for a rolling bearing, and more particularly to a rolling bearing cage suitably used as a cage for a rolling bearing for supporting a spindle of a machine tool, and a rolling bearing having the cage.

In conventional cylindrical roller bearings for rotatably supporting a spindle of a machine tool, a microlubrication system for lubricating rolling elements and raceway surfaces has often been adopted in order to suppress the generation of heat by a lubricant and also to suppress an increase of a torque due to a viscous resistance to rolling and an agitation resistance which develop because of the existence of the lubricant (see JP-A-2002-349580 for example).

Also, in order to prevent seizure due to a lack of the lubricant, a resin cage more excellent in self-lubricating ability than a metallic cage is often used.

Here, when the microlubrication system is used for lubricating the rolling elements and the raceway surfaces, the amount of the lubricant supplied between an outer peripheral surface (guide surface) of the cage and an outer ring sometimes becomes insufficient, so that the amount of heat (heating due to sliding) generated by the sliding of the cage relative to the outer ring increases, which leads to a possibility that the cage is subjected to damage or the like, thus shortening the life of the cage.

SUMMARY OF THE INVENTION

It is therefore an object of this invention to provide a cage for a rolling bearing in which even when a microlubrication system is adopted, a lack of lubrication on an outer peripheral surface of the cage is less liable to occur, and the amount of heat generated by the sliding of the cage relative to an outer ring is small, and a life of the cage is prolonged.

In order to achieve the above object, the present invention provides the following arrangements.

(1) A cage for a rolling bearing, the cage comprising:
  a first annular portion;
  a second annular portion opposed to the first annular portion in an axial direction of the first annular portion;
  a plurality of pillar portions which are spaced from one another in a circumferential direction of the first annular portion, and interconnect the first and second annular portions, each of the pillar portions having a concave surface formed in an outer peripheral surface thereof;
  a plurality of first recesses which are formed in an outer peripheral surface of the first annular portion, and are spaced from one another in the circumferential direction, the first recesses being disposed axially outwardly of an axial inner end face of the first annular portion, and being disposed axially inwardly of an axial outer end face of the first annular portion; and
  first passageways which extend generally in the axial direction, each of the first passageways including an axially outward end which is open to the corresponding first recess and an axially inner end which is open to the axial inner end face of the first annular portion or to the concave surface of the pillar portion.

(2) The cage according to (1) further comprising:
  a plurality of second recesses which are formed in an outer peripheral surface of the second annular portion, and are spaced from one another in the circumferential direction, the second recesses being disposed axially outwardly of an axial inner end face of the second annular portion, and being disposed axially inwardly of an axial outer end face of the second annular portion; and
  second passageways which extend generally in the axial direction, each of the second passageways including an axially outward end which is open to the corresponding second recess and an axially inner end which is open to the axial inner end face of the second annular portion or to the concave surface of the pillar portion.

(3) The cage according to (1), wherein the cage includes the first passageway which is open to the concave surface of the pillar portion.

(4) The cage according to (3), wherein the first passageway open to the concave surface of the pillar portion is formed so that a width of an opening of the first passageway in the circumferential direction, which is disposed at a radially-outward side of the first annular portion, gradually decreases toward the axial outer end of the first passageway in the axial direction.

(5) A rolling bearing comprising:
  an outer ring;
  an inner ring;
  rolling elements disposed between the outer ring and inner ring; and
  a cage according to claim 1 for retaining the rolling elements.

In the invention, the cage includes the plurality of first recesses which are formed in the outer peripheral surface of the first annular portion, and are spaced from one another in the circumferential direction, the first recesses being disposed outwardly of the axial inner end face of the first annular portion in the axial direction, and also being disposed inwardly of the axial outer end face of the first annular portion in the axial direction; and the first passageways which are open respectively to the first recesses at their one ends (outer ends) disposed outwardly of the other ends thereof in the axial direction, and extend generally in the axial direction. Therefore, when the rolling bearing cage (hereinafter referred to merely as "cage") is in use, a lubricant collected at edge portions of the pockets of the cage by the rotation and revolution of rolling elements passes through the first passageways, and is received in the first recesses. Therefore, an oil film can be formed between a cage guide surface of an outer ring and the outer peripheral surface of the cage by the lubricant received in the first recesses, and seizure of the cage and the outer ring can be suppressed, and therefore a life of the rolling bearing having this cage can be prolonged.

The inventor of the present invention has found that when the first recesses are extended to the axial outer end face of the first annular portion, a lubricant received in these first recesses can easily leak axially outwardly from the first annular portion, so that the effect of lubricating the outer peripheral surface of the cage and the cage guide surface of the outer ring is hardly achieved. On the other hand, the inventor has also found that when the first recesses are disposed axially inwardly of the axial outer end face of the first annular portion, the lubricant received in the first recesses will not easily leak axially outwardly from the first annular portion, so that the outer peripheral surface of the cage and the cage guide surface of the outer ring can be positively prevented for a long period of time from seizure.

In the invention, the first recesses are disposed axially inwardly of the axial outer end face of the first annular portion, and the lubricant received in the first recesses will not easily leak axially outwardly from the first annular portion, and therefore the outer peripheral surface of the cage and the cage guide surface of the outer ring can be positively prevented for a long period of time from seizure.

In the invention, seizure of both of the outer peripheral surfaces of the first and second annular portions can be suppressed.

In the invention, the cage includes the first passageway which is open to the concave surface of the pillar portion, and therefore the lubricant scraped at the outer peripheral surface of the pillar portion by the rotation and revolution of the rolling elements can be caused to smoothly pass through the first passageway open to this concave surface, and can be received in the first recess. Here, the amount of the lubricant scraped at the outer peripheral surface of the pillar portion is relatively large, and therefore the lubricant can be positively received in a relatively large amount in the first recess communicating with the first passageway.

In the invention, the first passageway open to the concave surface of the pillar portion is formed such that the width of the opening of the first passageway in the circumferential direction (which opening is disposed at the radially-outward side of the first annular portion) is gradually decreasing toward the axial outer end of the first passageway in the axial direction, and therefore a meniscus due to surface tension of the lubricant can be formed at the first passageway, so that the lubricant can be easily flowed into the first recess. And besides, the lubricant once received in the first recess is less liable to flow axially inwardly through the first passageway, and therefore the lubricant can be stably retained in the first recess.

In the present invention, when the cage is in use, the lubricant collected at the edge portions of the pockets of the cage by the rotation and revolution of the rolling elements passes through the first passageways, and is received in the first recesses. Therefore, an oil film can be formed between the cage guide surface of the outer ring and the outer peripheral surface of the cage by the lubricant received in the first recesses, and seizure of the cage and the outer ring can be suppressed, and therefore the life of the rolling bearing having this cage can be prolonged.

Furthermore, in the invention, the first recesses are disposed axially inwardly of the axial outer end face of the first annular portion, and the lubricant received in the first recesses will not easily leak axially outwardly from the first annular portion, and therefore the outer peripheral surface of the cage and the cage guide surface of the outer ring can be positively prevented for a long period of time from seizure.

DETAILED DESCRIPTION OF PREFERRED EMBODIMENTS

The present invention will now be described in detail with reference to illustrated embodiments.

First Embodiment

Figure 1:
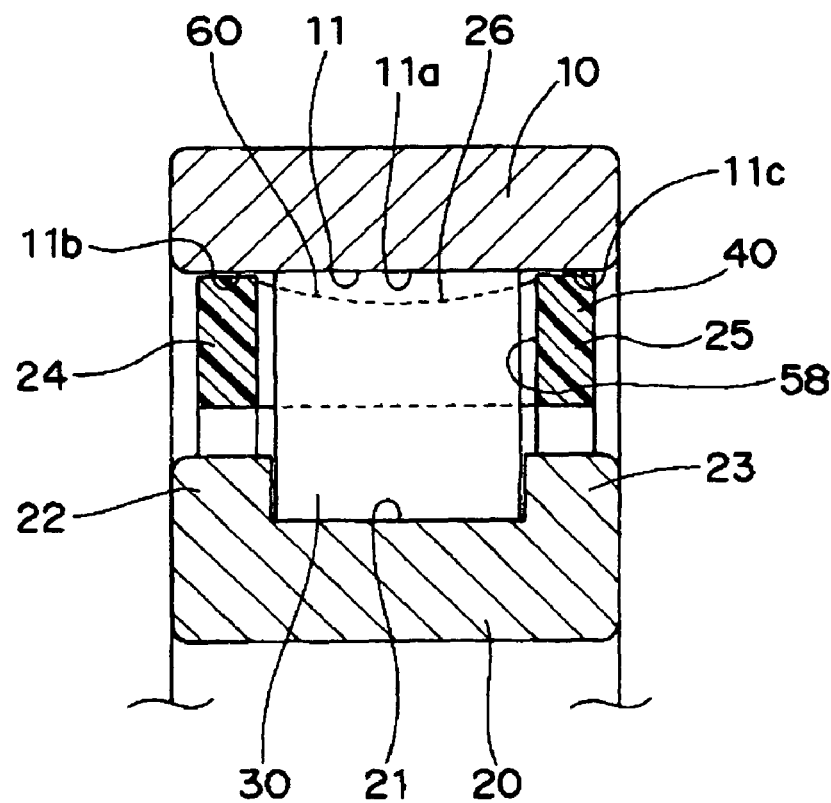
FIG. 1 is an axial cross-sectional view of a cylindrical roller bearing including a first embodiment of a cage of the present invention.

FIG. 1 is an axial (or longitudinal) cross-sectional view of a cylindrical roller bearing including a first embodiment of a rolling bearing cage (hereinafter referred to merely as "cage") of the invention.

This cylindrical roller bearing comprises an outer ring 10, an inner ring 20, a plurality of cylindrical rollers 30 as rolling elements, and the cage 40 according to the first embodiment of the invention for retaining the cylindrical rollers 30.

An inner peripheral surface 11 of the outer ring 10 has a cylindrical shape. An axially-central portion 11a of this inner peripheral surface 11 serves as a cylindrical raceway surface, and one axial end portion 11b of the inner peripheral surface 11 and the other axial end portion 11c thereof serve respectively as cage guide surfaces. On the other hand, the inner ring 20 has a cylindrical raceway surface 21 formed at a central portion of its outer peripheral surface. This inner ring 20 has a first rib 22 formed at one axial end portion of the cylindrical raceway surface 21, and also has a second rib 23 formed at the other axial end portion of the cylindrical raceway surface 21. In this cylindrical roller bearing, various sliding portions, including outer surfaces of the cylindrical rollers 30, the cylindrical raceway surfaces 11a and 21 of the bearing rings 10 and 20, the first rib 22 and the second rib 23, are lubricated by oil and air lubrication although this is not shown in detail.

The cage 40 is made of a resin material. The cage 40 includes a first annular portion 24, a second annular portion 25, and a plurality of pillar portions 26. The pillar portions 26 extend generally in an axial direction (more accurately, in a direction of an axis of the first annular portion 24). The pillar portions 26 interconnect the first annular portion 24 and the second annular portion 25. The plurality of pillar portions 26 are arranged at predetermined intervals in a circumferential direction (more accurately, in a circumferential direction of the first annular portion 24).

In the cross-section shown in FIG. 1, an outer peripheral surface of each pillar portion 26 has a generally radially inwardly-convex arc-shape. Namely, the outer peripheral surface of the pillar portion 26 has a concave surface 60. Axial opposite end portions of the outer peripheral surface of the pillar portion 26 are disposed radially outwardly of an axially-central portion of the outer peripheral surface of the pillar portion 26 (more accurately, disposed outwardly of this axially-central portion in a radial direction of the first annular portion 24). The axially-central portion of the outer peripheral surface of the pillar portion 26 is disposed in the most radially inward position than the remainder of the outer peripheral surface of the pillar portion 26. The concave surface 60 is generally symmetrical with respect to a perpendicular bisector of the cage 40 bisecting the cage 40 through a plane perpendicular to the center axis of the cage 40.

An outer peripheral surface of the first annular portion 24 is radially opposed to the one end portion 11b of the outer ring 20 with a slight clearance formed therebetween, while the outer peripheral surface of the second annular portion 25 is radially opposed to the other end portion 11c of the outer ring 20 with a slight clearance formed therebetween. The one end portion 11b of the outer ring 20 guides the first annular portion 24, while the other end portion 11c of the outer ring 20 guides the second annular portion 25.

The plurality of cylindrical rollers 30 are held between the cylindrical raceway surface 11a of the outer ring 10 and the cylindrical raceway surface 21 of the inner ring 20 by the cage 40, and are spaced from one another in the circumferential direction.

Figure 2:
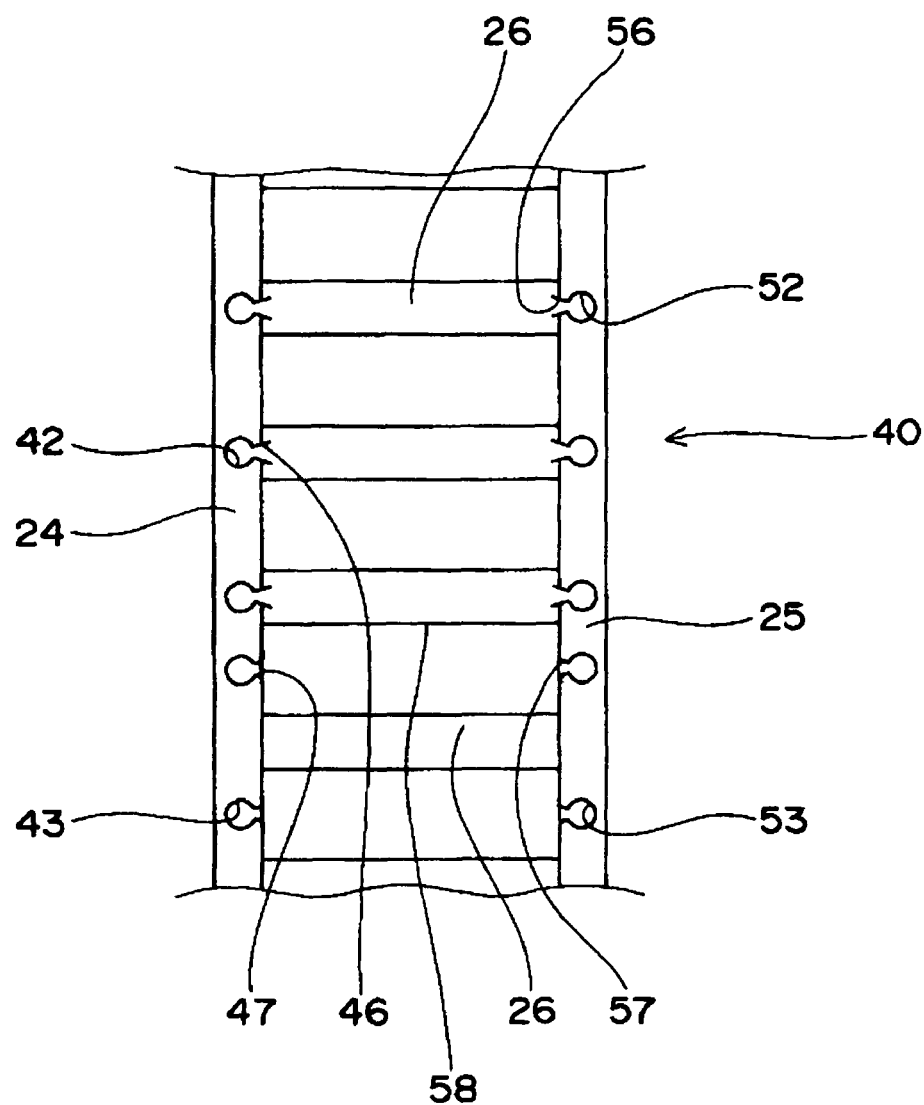
FIG. 2 is a schematic view of the cage of the first embodiment as seen from a radially-outward side thereof.

FIG. 2 is a schematic view of the cage 40 as seen from a radially-outward side thereof.

As shown in FIG. 2, the cage 40 has a plurality of first recesses 42 and 43 formed in the outer peripheral surface of the first annular portion 24, and also has a plurality of first passageways 46 and 47 formed in this outer peripheral surface.

A depth of the first recesses 42 and 43 is set to not more than 1 mm. The first recesses 42 and 43 are disposed outwardly of an axial inner end face of the first annular portion 24 in the axial direction, and are disposed inwardly of an axial outer end face of the first annular portion 24 in the axial direction. The first recesses 42 and 43 are opposed to (or disposed in registry with) the corresponding pillar portions 26 in the axial direction, or are opposed respectively to (or disposed in registry with) corresponding pockets 58 (each receiving the cylindrical roller 30) in the axial direction. Hereinafter, those of the first recesses 42 and 43 which are opposed to the respective pillar portions 26 in the axial direction will be referred to as the first pillar-opposing recesses 42, while those of the first recesses 42 and 43 which are opposed to the respective pockets 58 in the axial direction will be referred to as the first pocket-opposing recesses 43.

The first passageways 46 and 47 extend generally in the axial direction. Axial outer ends (one ends) of the first passageways 46 and 47 are open respectively to the first recesses 42 and 43. The first passageways 46 and 47 are open to the first pillar-opposing recesses 42, or are open to the first pocket-opposing recesses 43. Hereinafter, those of the first passageways which are open at their axial outer ends to the respective first pillar-opposing recesses 42 will be referred to as the first concave surface open passageways 46, while those of the first passageways which are open at their axial outer ends to the respective first pocket-opposing recesses 43 will be referred to as the first pocket open passageways 47.

Further, the cage 40 has a plurality of second recesses 52 and 53 formed in the outer peripheral surface of the second annular portion 25, and also has a plurality of second passageways 56 and 57 formed in this outer peripheral surface.

A depth of the second recesses 52 and 53 is set to not more than 1 mm. The second recesses 52 and 53 are disposed outwardly of an axial inner end face of the second annular portion 25 in the axial direction, and are disposed inwardly of an axial outer end face of the second annular portion 25 in the axial direction. The second recesses 52 and 53 are opposed to (or disposed in registry with) the corresponding pillar portions 26 in the axial direction, or are opposed to (or disposed in registry with) the corresponding pockets 58 (each receiving the cylindrical roller 30) in the axial direction. Hereinafter, those of the second recesses 52 and 53 which are opposed to the respective pillar portions 26 in the axial direction will be referred to as the second pillar-opposing recesses 52, while those of the second recesses 52 and 53 which are opposed to the respective pockets 58 in the axial direction will be referred to as the second pocket-opposing recesses 53.

The second passageways 56 and 57 extend generally in the axial direction. Axial outer ends (one ends) of the second passageways 56 and 57 are open respectively to the second recesses 52 and 53. The second passageways 56 and 57 are open to the second pillar-opposing recesses 52, or are open to the second pocket-opposing recesses 53. Hereinafter, those of the second passageways which are open at their axial outer ends to the respective second pillar-opposing recesses 52 will be referred to as the second concave surface open passageways 56, while those of the second passageways which are open at their axial outer ends to the respective second pocket-opposing recesses 53 will be referred to as the second pocket open passageways 57.

As shown in FIG. 2, the first pocket open passageways 47 communicating with the respective first pocket-opposing recesses 43 are open at their axial inner ends to the axial inner end face of the first annular portion 24. The second pocket open passageways 57 communicating with the respective second pocket-opposing recesses 53 are open at their axial inner ends to the axial inner end face of the second annular portion 25. A width of an axially-outer opening of the first pocket open passageway 47 in the circumferential direction is gradually decreasing toward the axial outer end of this first pocket open passageway 47. The first pocket open passageway 47 and the second pocket open passageway 57 are identical in configuration (size and shape) to each other.

Figure 3A:
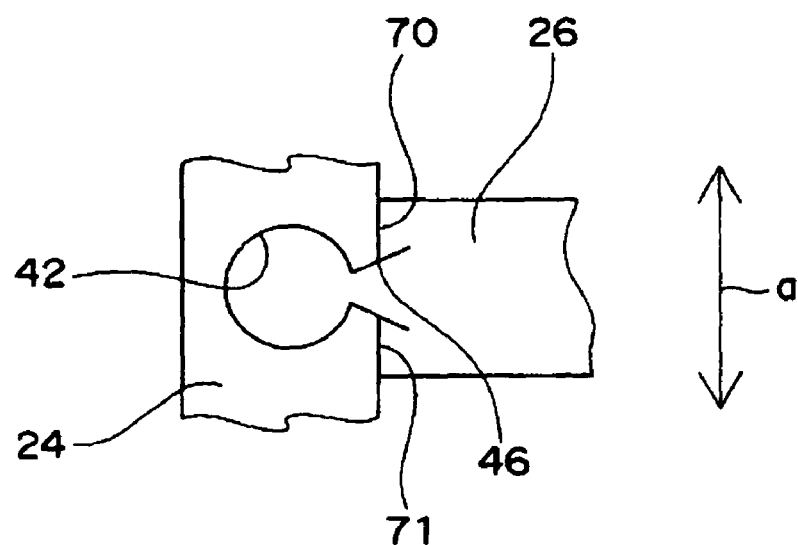
FIG. 3A is an enlarged view of a portion of the cage of FIG. 2, showing a first pillar-opposing recess and its vicinities.
Figure 3B:
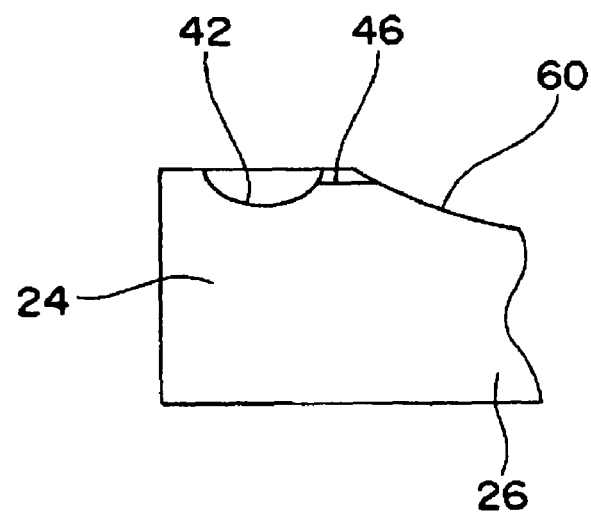
FIG. 3B is a schematic cross-sectional view of the cage portion of FIG. 3A taken through a plane in which a center axis of a first annular portion and a bottom of an inner surface (defined by part of a spherical surface) of the first pillar-opposing recess lie.

FIG. 3A is an enlarged view of a portion of the cage of FIG. 2, showing the first pillar-opposing recess 42 and its vicinities. FIG. 3B is a schematic cross-sectional view of the cage portion of FIG. 3A taken through a plane in which the center axis of the first annular portion 24 and a bottom of an inner surface (defined by part of a spherical surface) of the first pillar-opposing recess 42 lie. In FIG. 3A, reference numerals 70 and 71 denote lines indicating the boundary between the first annular portion 24 and the pillar portion 26. These lines 70 and 71 are shown for the sake of better understanding.

As shown in FIG. 3A, the first pillar-opposing recess 42, when seen from the radially-outward side, has a generally round contour. The inner surface of the first pillar-opposing recess 42 is defined by part of a spherical surface. As shown in FIG. 3A, a width of an axially-outer opening of the first concave surface open passageway 46 in the circumferential direction (indicated by arrow a in FIG. 3A) is gradually decreasing toward the axial outer end of this first concave surface open passageway 46. In FIG. 3B, the depth of the first pillar-opposing recess 42 and the curvature of the concave surface 60 of the pillar portion 26 are shown in an exaggerated manner.

As shown in FIG. 3B, the first concave surface open passageways 46 are open at their axial outer ends (one ends) to the respective first pillar-opposing recesses 42, and are also open at their axial inner ends (the other ends thereof) to the respective concave surfaces 60.

The first pillar-opposing recess 42 is identical in configuration (size and shape) to the first pocket-opposing recess 43, the second pillar-opposing recess 52 and the second pocket-opposing recess 53. The first concave surface open passageway 46 in the first annular portion 24 is identical in configuration (size and shape) to the second concave surface open passageway 56 in the second annular portion 25.

The inventor of the present invention has found that when the recesses are extended to the axial outer end face of the annular portion, a lubricant received in these recesses can easily leak axially outwardly from the annular portion, so that the effect of lubricating the outer peripheral surface of the cage and the cage guide surfaces of the outer ring is reduced. On the other hand, the inventor has also found that when the recesses are disposed axially inwardly of the axial outer end face of the annular portion, the lubricant received in these recesses will not easily leak axially outwardly from the annular portion, so that the outer peripheral surface of the cage and the cage guide surfaces of the outer ring can be positively prevented for a long period of time from seizure.

In the cage 40 of the first embodiment, the first annular portion 24 has the plurality of first recesses 42 and 43 formed in the outer peripheral surface thereof and spaced from one another in the circumferential direction, the first recesses 42 and 43 being disposed axially outwardly of the axial inner end face of the annular portion 24 and also disposed axially inwardly of the axial outer end face of the annular portion 24. The cage 40 further has the plurality of first passageways 46 and 47 which extend generally in the axial direction and are open at their axial outer ends (one ends) to the respective first recesses 42 and 43. Therefore, when the cage 40 is in use, the lubricant collected at edge portions of the pockets 58 of the cage 40 by the rotation and revolution of the cylindrical rollers 30 passes through the first passageways 46 and 47, and is received in the first recesses 42 and 43. Therefore, an oil film can be formed between the cage guide surface 11b, 11c of the outer ring 10 and the outer peripheral surface of the cage 40 by the lubricant received in the first recesses 42 and 43, and seizure of the cage 40 and the outer ring 10 can be suppressed, and therefore the life of the cylindrical roller bearing having this cage 40 can be prolonged.

Furthermore, in the cage 40 of the first embodiment, the first recesses 42 and 43 are disposed axially inwardly of the axial outer end face of the first annular portion 24, and the lubricant received in the first recesses 42 and 43 will not easily leak axially outwardly from the first annular portion 24, and therefore the outer peripheral surface of the cage 40 and the cage guide surface of the outer ring 10 can be positively prevented for a long period of time from seizure.

Furthermore, in the cage 40 of the first embodiment, the first annular portion 24 has the recesses 42 and 43, and the second annular portion 25 has the recesses 52 and 53, and therefore seizure of both of the outer peripheral surfaces of the first and second annular portions 24 and 25 can be suppressed.

Furthermore, in the cage 40 of the first embodiment, at least one of the plurality of first passageways 46 and 47 is open at its axial inner end (the other end thereof) to the concave surface 60 of the pillar portion 26, and therefore the lubricant scraped at the outer peripheral surface of the pillar portion 26 by the rotation and revolution of the cylindrical rollers 30 can be caused to smoothly pass through the first passageway 46 open to this concave surface 60, and can be received in the first recess 42 communicating with this first passageway 46. Here, the amount of the lubricant scraped at the outer peripheral surface of the pillar portion 26 is relatively large, and therefore the lubricant can be positively received in a relatively large amount in the first recess 42 communicating with the first passageway 46.

In the cage 40 of the first embodiment, the first passageway 46 open at its axial inner end (the other end thereof) to the concave surface 60 of the pillar portion 26 is formed such that the width of the opening of the first passageway 46 in the circumferential direction (which opening is disposed at the radially-outward side of the first annular portion 24) is gradually decreasing toward the axial outer end of the first passageway 46 in the axial direction, and therefore a meniscus due to surface tension of the lubricant can be formed at the first passageway 46, so that the lubricant can be easily flowed into the first recess 46 axially opposed to the pillar portion 26. And besides, the lubricant once received in the first recess 42 is less liable to flow axially inwardly through the first passageway 46, and therefore the lubricant can be stably retained in the first recess 42.

In the cage 40 of the first embodiment, both of the two annular portions 24 and 25 have the recesses 42, 43, 52 and 53. In the invention, however, only one of the two annular portions 24 and 25 may have the recesses. In another modified form, one of the two annular portions may have only the recesses disposed in axial registry with the corresponding pillar portions, or may have only the recesses disposed in axial registry with the corresponding pockets. Similarly, the other annular portion may have only the recesses disposed in axial registry with the corresponding pillar portions, or may have only the recesses disposed in axial registry with the corresponding pockets. When only the recesses disposed in axial registry with the corresponding pillar portions are formed in the annular portion, the reduction of the strength of the cage due to the formation of the recesses and the passageways therein can be minimized, and therefore this is desirable.

In the cage 40 of the first embodiment, each of the recesses 42, 43, 52 and 53 is defined or formed by part of a spherical surface. In the invention, however, each recess may be formed by a surface of any suitable shape other than part of the spherical surface, and for example the inner surface of each recess may be defined by part of a rectangular parallelepiped surface.

Furthermore, in the cage 40 of the first embodiment, the outer peripheral surface of each of the annular portions 24 and 25 is radially opposed to the inner peripheral surface of the outer ring 10, with a slight clearance formed therebetween. In the invention, however, the outer peripheral surface of each annular portion may be disposed in contact with the inner peripheral surface of the outer ring.

Furthermore, the cage 40 of the first embodiment has the pockets 58 for receiving the cylindrical rollers 30. In the invention, however, the cage may have pockets for receiving other rolling elements than the cylindrical rollers, such as balls, taper rollers or the like.

Second Embodiment

Figure 4:
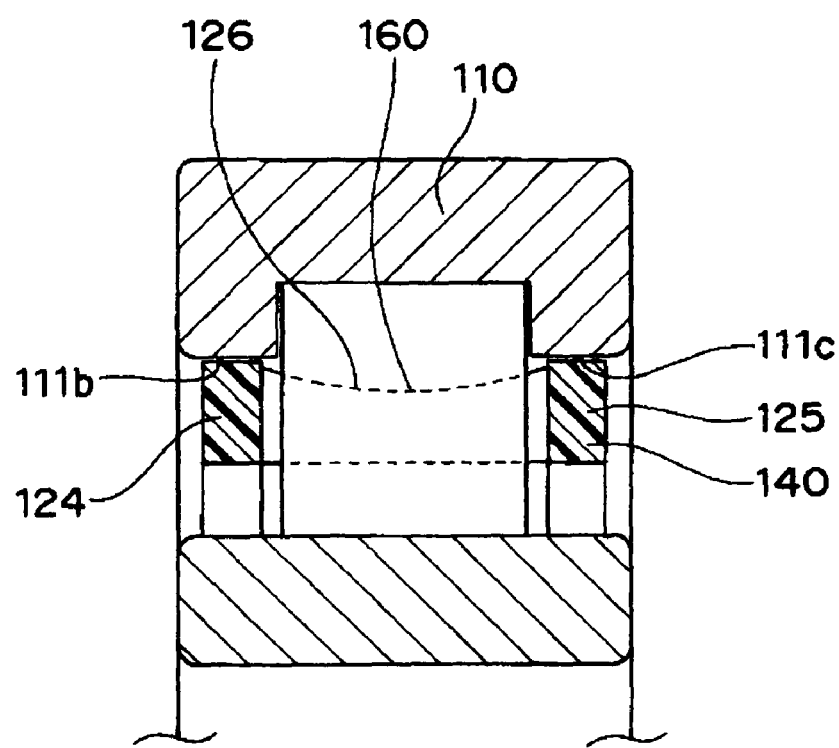
FIG. 4 is an axial cross-sectional view of a cylindrical roller bearing including a second embodiment of a cage of the invention.

FIG. 4 is an axial cross-sectional view of a cylindrical roller bearing including a second embodiment of a roller bearing cage (hereinafter referred to merely as "cage") 140 of the invention.

In the cage 140 of the second embodiment, description of advantageous effects and modifications similar to those of the cage 40 of the first embodiment will be omitted.

The cage 140 of the second embodiment differs from the cage 40 of the first embodiment only in that the cage 140 is disposed more radially inwardly as compared with the cage 40 of the first embodiment when cylindrical raceway surfaces of their outer rings have the same inner diameter and that outer peripheral surfaces of two annular portions 124 and 125 are radially opposed respectively to inner peripheral surfaces of ribs 111b and 111c formed respectively at opposite end portions of the cylindrical raceway surface of the outer ring 110, with a slight clearance formed therebetween.

Namely, in the cage 140 of the second embodiment, also, recesses are formed in the outer peripheral surfaces of the two annular portions 124 and 125, and the cage 140 has passageways communicating with the corresponding recesses. Further, as shown in FIG. 4, each pillar portion 126 has a concave surface 160, and at least one of the passageways is open to the concave surface 160.

Therefore, in the second embodiment, also, seizure of the outer peripheral surfaces of the two annular portions 124 and 125 can be suppressed as in the first embodiment, and therefore a life of the cage 140 can be more prolonged as compared with conventional cages.

What is claimed is:

1. A cage for a rolling bearing, the cage comprising:
a first annular portion;
a second annular portion opposed to the first annular portion in an axial direction of the first annular portion;
a plurality of pillar portions which are spaced from one another in a circumferential direction of the first annular portion, and interconnect the first and second annular portions, each of the pillar portions having a concave surface formed in an outer peripheral surface thereof;
a plurality of first recesses which are formed in an outer peripheral surface of the first annular portion, and are spaced from one another in the circumferential direction, the first recesses being disposed axially outwardly of an axial inner end face of the first annular portion, and being disposed axially inwardly of an axial outer end face of the first annular portion; and
first passageways which extend generally in the axial direction, each of the first passageways including an axially outward end which is open to the corresponding first recess and an axially inner end which is open to the axial inner end face of the first annular portion or to the concave surface of the pillar portion.

2. The cage according to claim 1 further comprising:
a plurality of second recesses which are formed in an outer peripheral surface of the second annular portion, and are spaced from one another in the circumferential direction, the second recesses being disposed axially outwardly of an axial inner end face of the second annular portion, and being disposed axially inwardly of an axial outer end face of the second annular portion; and
second passageways which extend generally in the axial direction, each of the second passageways including an axially outward end which is open to the corresponding second recess and an axially inner end which is open to the axial inner end face of the second annular portion or to the concave surface of the pillar portion.

3. The cage according to claim 1, wherein the cage includes the first passageway which is open to the concave surface of the pillar portion.

4. The cage according to claim 3, wherein the first passageway open to the concave surface of the pillar portion is formed so that a width of an opening of the first passageway in the circumferential direction, which is disposed at a radially-outward side of the first annular portion, gradually decreases toward the axial outer end of the first passageway in the axial direction.

5. A rolling bearing comprising:
an outer ring;
an inner ring;
rolling elements disposed between the outer ring and inner ring; and
a cage according to claim 1 for retaining the rolling elements.

* * * * *